Figure 1:
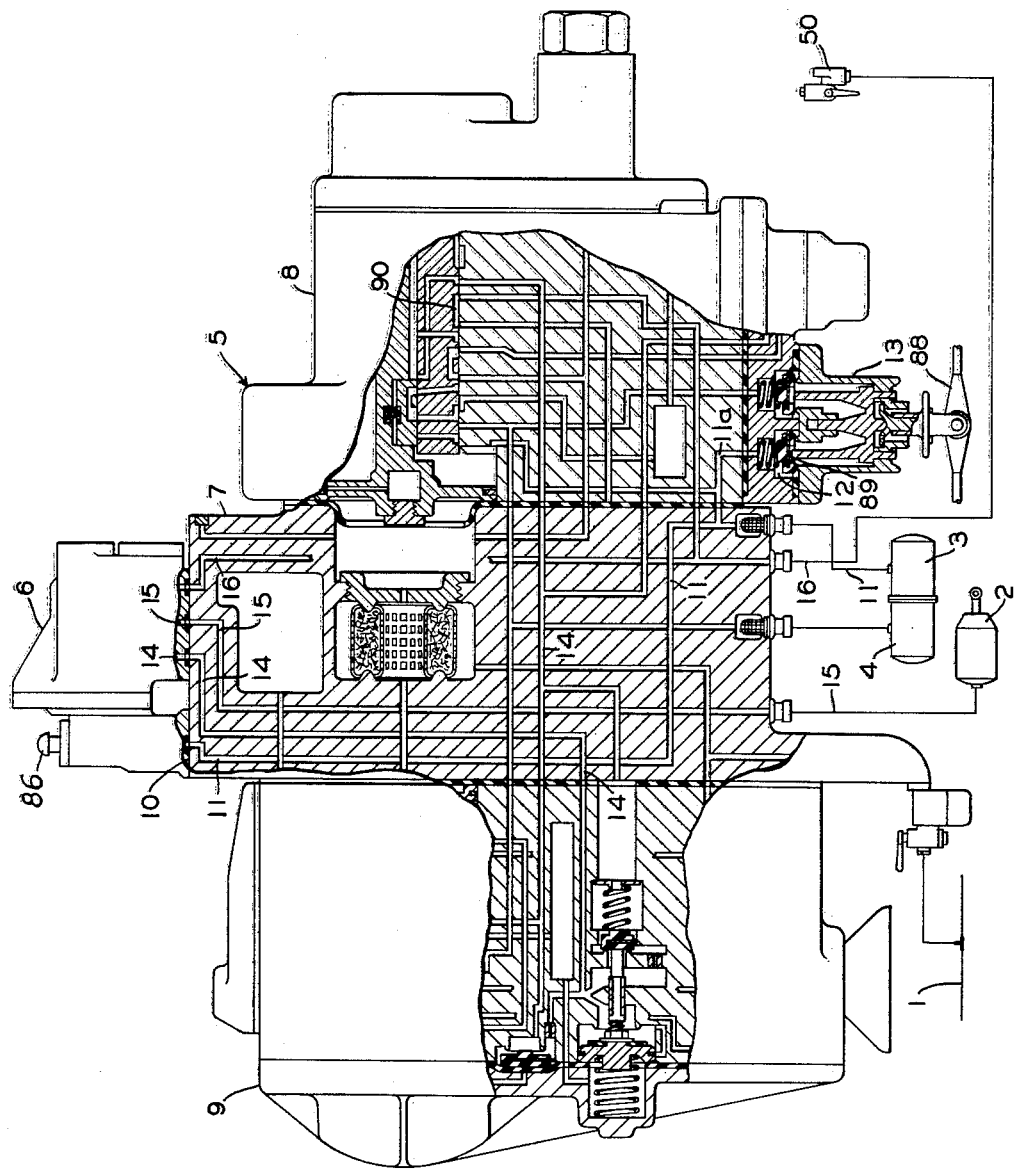

INVENTOR.
Francis Robert Racki
BY
*A. A. Steinmiller*
Attorney

United States Patent Office 3,140,125
Patented July 7, 1964

3,140,125
BRAKE CYLINDER RELEASE VALVE DEVICE
Francis Robert Racki, Pittsburgh, Pa., assignor to Westinghouse Air Brake Company, Wilmerding, Pa., a corporation of Pennsylvania
Filed Mar. 13, 1962, Ser. No. 179,449
8 Claims. (Cl. 303—69)

This invention relates to brake cylinder release valve devices of the type used in fluid pressure brake equipment for railway cars and the like to enable fluid under pressure to be locally released from each brake cylinder device on the car while the car is detached from a train, without depleting the fluid under pressure in the usual auxiliary and emergency reservoirs on the car which reservoirs are at this time connected to the brake cylinder device through the usual control valve device, such as the well-known AB control valve device, provided on the car.

Brake cylinder release valve devices have been heretofore employed and usually comprise valve means normally biased to a so-called normal position to connect each brake cylinder device with a brake cylinder pipe that is connected to the brake cylinder passageway in the control valve device, such as the well-known AB control valve device, so that fluid under pressure will normally be supplied to each brake cylinder device at the pressure provided in the brake cylinder pipe by the control valve device responsively to variations in the pressure of the fluid in the usual brake pipe that extends from car to car through a train. The valve means of the conventional brake cylinder release valve device is manually actuable to a release position to disconnect the brake cylinder pipe that is connected to the brake cylinder passageway in the control valve device, from each brake cylinder device and to connect the brake cylinder device to atmosphere, so that the fluid under pressure in the brake cylinder device may be reduced to atmospheric pressure without depleting the pressure of the fluid in the reservoirs if they are still connected to the brake cylinder pipe through the control valve device.

When the conventional type of brake cylinder release valve device is employed on certain type freight cars, it oftentimes must be located in such a position as to require an inconvenient, unhandy and awkward arrangement of the operating rod extending from the brake cylinder release valve device to one side of the car where this end of the rod may be grasped by a trainman to effect manual operation of the brake cylinder release valve device.

The general purpose of this invention is to provide a brake cylinder release valve device that can be operated by the manipulation of the conventional duplex release valve operating rod found on all modern freight cars and therefore does not require a separate actuating rod of its own.

This invention comprises a novel brake cylinder release valve device operable to vent brake cylinder pressure to atmosphere upon a reduction in the pressure acting on one side of the conventional brake cylinder release valve device operating diaphragm via a spring-biased check valve, in response to momentary manual operation of the conventional duplex release valve associated with the AB control valve to effect a slight reduction in auxiliary reservoir pressure. A manually operated push button is provided for unseating the check valve to effect the resupply of fluid under pressure from the auxiliary reservoir to the one side of the brake cylinder release valve device operating diaphragm to cause the equalization of pressure on the opposite sides of the diaphragm and the operation of the brake cylinder release valve device to a brake reapplication position by a spring acting on the one side of the diaphragm in which brake reapplication position a communication is again established between the brake cylinder pipe connected to the brake cylinder passageway in the control valve device and the brake cylinder device whereupon the brakes on the car are reapplied if the control valve device is in its emergency position.

In the accompanying drawings:

FIG. 1 is an elevational view in outline of a brake cylinder release valve device embodying the invention shown associated with a control valve device, such as the well-known AB control valve device, represented diagrammatically in its emergency position, and the usual fluid pressure reservoirs and conventional brake cylinder device that are required for use with the AB control valve device to constitute a complete fluid pressure brake equipment for a railway car.

Figure 2:
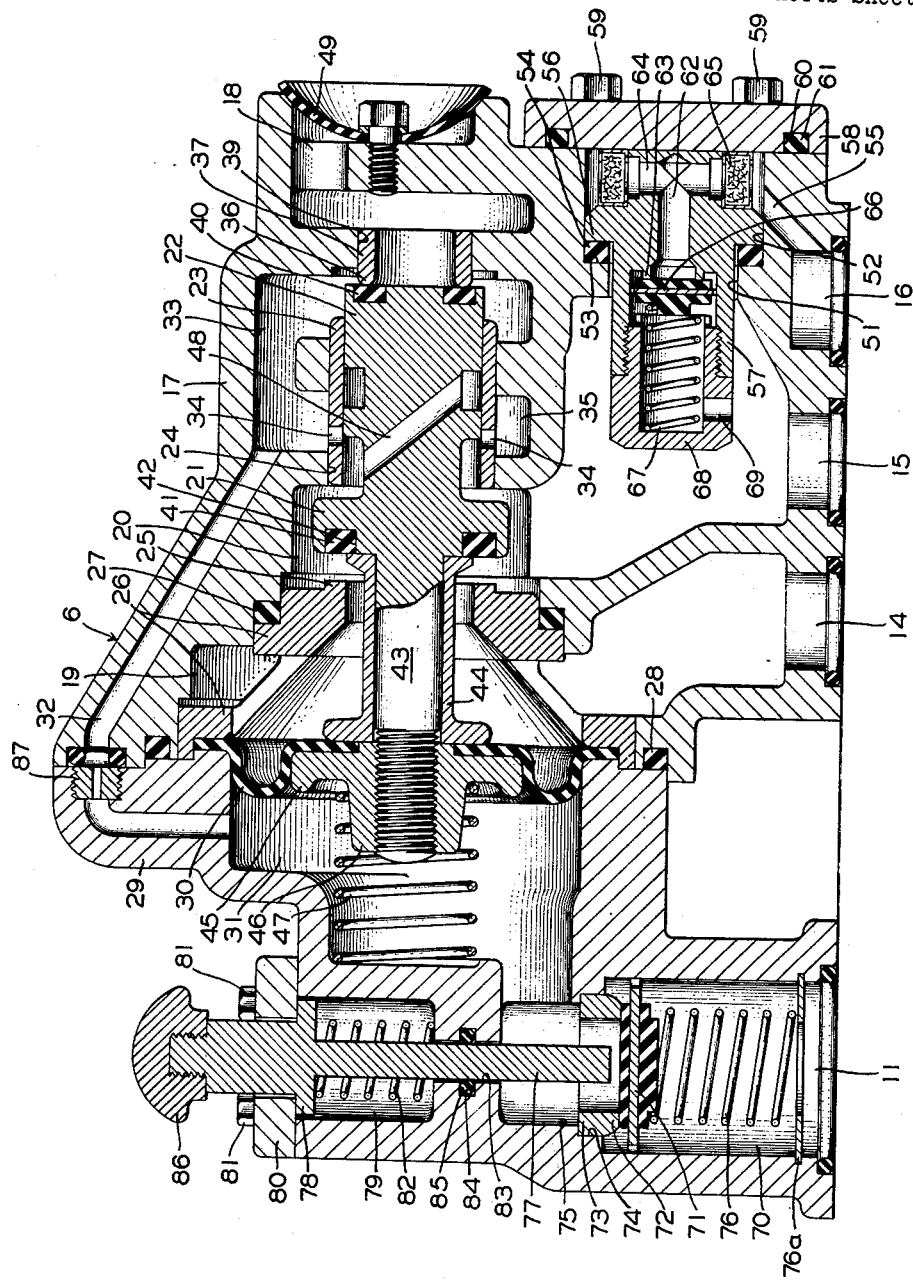

FIG. 2 is an elevational view, in section and on an enlarged scale, of the brake cylinder release valve device shown in outline in FIG. 1.

*Description*

Referring to FIG. 1 of the drawings, the freight car fluid pressure brake apparatus embodying the invention comprises a brake pipe 1 that extends from end to end of the car, a brake cylinder device 2, an auxiliary reservoir 3, an emergency reservoir 4, a brake control valve device 5 connected to the brake pipe 1 and controlled by variations in pressure therein, and a brake cylinder release valve device 6 for effecting a release of fluid under pressure from the brake cylinder device 2.

The brake control valve device 5 may be of the type, such as that disclosed in United States Patent No. 2,031,213, issued February 18, 1936, to Clyde C. Farmer, and assigned to the assignee of the present application, except that the pipe bracket shown in the Farmer patent is replaced by a pipe bracket 7. The brake control valve device 5 comprises in addition to the pipe bracket 7, a service portion 8 and an emergency portion 9 which service portion and emergency portion are identical with the service portion and emergency portion shown in the Farmer patent and, in view of this, it is deemed unnecessary to show and describe these portions in detail. It will, of course, be understood that the brake control valve device 5 operates upon a service reduction in brake pipe pressure to supply fluid under pressure from the auxiliary reservoir 3 to the brake cylinder device 2 to effect a service application of the brakes, upon an emergency reduction of brake pipe pressure to supply fluid under pressure from both the auxiliary reservoir 3 and the emergency reservoir 4 to the brake cylinder device 2 to effect an emergency application of the brakes, and upon an increase in brake pipe pressure to effect a release of the brakes, as well as the recharging of the auxiliary reservoir 3 and emergency reservoir 4.

The pipe bracket 7 may be identical in construction to the pipe bracket shown in the above-mentioned Farmer patent except as will now be described. The pipe bracket 7, as shown in FIG. 1, is provided with a bolting face 10 to which the brake cylinder release valve device 6 is secured by any suitable means (not shown).

As shown in FIG. 1 of the drawings, there are four ports opening at the surface of the bolting face 10 and these ports are connected by corresponding passageways that extend through the pipe bracket 7. A first passageway 11 extends from the corresponding port opening at the bolting face 10 through the pipe bracket 7 to a corresponding pipe bearing the same reference numeral which pipe is connected to the auxiliary reservoir 3. A branch 11a of the passageway 11 extends to a chamber 12 formed in a duplex release valve device 13 which constitutes a part of the service portion 8 and may be identical to the duplex release valve device shown and described in the above-mentioned Farmer patent. A second port 14 in the bolting face 10 is connected by a corresponding passageway 14 to the inshot valve portion of the emergency portion 9, which inshot valve is identical in construction to the inshot valve shown and described in the above-mentioned Farmer patent. A third port 15 opening at the face of the bolting face 10 is connected by a corresponding passageway 15 that extends from said bolting face 10 through the pipe bracket 7 to a corresponding pipe bearing the same reference numeral, which pipe is connected to the brake cylinder device 2. A remaining port 16 in the bolting face 10 is connected by a corresponding passageway 16 that extends through the pipe bracket 7 to a corresponding pipe bearing the same reference numeral, which pipe is connected to the usual retainer valve device such as the retainer valve device 194 shown in the above-mentioned Farmer patent.

The brake cylinder release valve device 6 embodying the invention is shown in detail in FIG. 2 of the drawings and comprises a sectionalized casing 17 providing an exhaust port 18, an inlet chamber 19 into which the passageway 14 in the pipe bracket 7 opens, and an outlet chamber 20 connected via the port and passageway 15 in the pipe bracket 7 and the corresponding pipe to the brake cylinder device 2.

A valve 21 preferably of the disc type is disposed in the outlet chamber 20 and controls connection of the inlet chamber 19 with the outlet chamber 20. Formed integral with the valve 21 is a cylindrical exhaust valve member 22 which is sealingly reciprocable in a bushing 23 having a press-fit within a bore 24 in the casing 17.

A valve seat 25 for the valve 21 is shown as formed on the right-hand side of an insert or spider 26 which is sealed by gaskets 27 and 28 and which is clamped by a cap or cover 29 of the form clearly shown in FIG. 2 of the drawings.

The cap 29 is bolted by bolts (not shown) to the sectionalized casing or housing 17 and clamps the peripheral margin of a flexible diaphragm or movable abutment 30 shown as of the corrugated type against the spider 26.

The right-hand side of the diaphragm 30 is subject to the pressure in the chamber 19. The diaphragm 30 is subject on its left-hand side to pressure in a chamber 31 which is connected by a passageway 32 with a chamber 33 formed in the right-hand end of the sectionalized casing or housing 17. The chamber 20 and the chamber 33 communicate with each other through the bore of the bushing 23, which is pressed into the bore 24 extending between these two chambers and a plurality of lateral ports 34 in the bushing 23 which ports 34 communicate with an annular passageway 35 that opens into the chamber 33 which, as before mentioned, is connected by the passageway 32 with the chamber 31.

Controlling discharge from the right-hand end of the chamber 33 is a valve seat 36 formed on the left-hand end of a bushing 37 which is pressed into a bore 39 that connects the chamber 33 with the exhaust port 18. The cylindrical exhaust valve member 22 carries on its right-hand end a rubber-faced valve 40 which normally seals against valve seat 36, and carries at its left-hand end the valve 21 which is formed integral therewith. The valve 21 carries at its left-hand end a rubber insert 41 disposed in a recess 42, which insert 41 may close against the seat 25 at which time the rubber-faced valve 40 carried by the right-hand end of the cylindrical exhaust valve member 22 will be unseated from the valve seat 36.

A stem 43, formed integral with the cylindrical exhaust valve member 22 and extending leftward therefrom, passes through the center of the diaphragm 30 and is clamped to the center of the diaphragm by a flanged sleeve 44 disposed on the right-hand side of the diaphragm and about the stem 43, a thrust plate or diaphragm follower 45 which overlies the left-hand side of the diaphragm, and a nut 46 formed integral with the diaphragm follower 45.

A biasing spring 47 disposed between the diaphragm follower 45 and the cap 29 urges the diaphragm 30, the stem 43, valve 21 and cylindrical exhaust valve member 22 in the direction of the right hand so that the rubber-faced valve 40 carried at the right-hand end of the cylindrical exhaust valve member 22 is normally seated on the valve seat 36 and the valve 21 is normally unseated from the valve seat 25. The cylindrical exhaust valve member 22 is provided with a diagonally arranged passageway 48, which when the valve 21 is moved into contact with valve seat 25, establishes a communication from the outlet chamber 20 to the annular passageway 35 and thence via the ports 34, chamber 33 and past the now unseated rubber-faced valve 40 carried by cylindrical exhaust valve member 22 to the exhaust port 18 which is normally closed by a wasp excluder or vent protector 49 that is adapted to open in response to any pressure present in the exhaust port 18 to release this pressure to atmosphere.

The exhaust of the brake control valve device 5 is connected to the passageway and pipe 16, as shown in FIG. 1, which pipe 16 leads to a retainer 50. This retainer can be of any desired type having two, three, or four positions.

Assuming that the retainer 50 is of the four-position type, in position 1 of the retainer, free exhaust is afforded from the pipe 16; in position 2, 10 lbs.; and in position 3, 20 lbs. brake cylinder pressures are retained, while position 4 affords a slow or restricted release flow to atmosphere from the pipe 16.

Referring again to FIG. 2 of the drawings, it will be seen that the sectionalized casing 17 is provided with a bore 51 that opens from the exterior thereof into the outlet chamber 20 and a coaxial counterbore 52, the end of which forms a shoulder 53 against which rests a rubber insert 54 in the form of an annulus. Formed in the sectionalized casing 17 and having one end opening at the surface of the counterbore 52 is a passageway 55. The opposite end of the passageway 55 registers with the port and passageway 16 in the pipe bracket 7. Disposed in the counterbore 52 and resting against the rubber insert 54 is a flange 56 formed intermediate the ends of a check valve body 57, one end of which extends through the bore 51 into the outlet chamber 20. The check valve body 57 is retained against the rubber insert 54 by a cover member 58 which is secured to the sectionalized casing 17 by a plurality of cap screws 59. The cover member 58 is provided with an annular groove 60 in which is disposed an O-ring seal 61 to prevent leakage between the sectionalized casing 17 and the cover member 58 when the cover member is securely fastened to the sectionalized casing by the cap screws 59.

The check valve body 57 has a passageway 62 extending horizontally therethrough, as shown in FIG. 2. A valve seat 63 surrounds the left-hand end of the passageway 62 and the right-hand end of this passageway is open to a cross drilled passageway 64 at right angles thereto. Surrounding the right-hand end of the check valve body 57 and the opposite ends of the cross drilled passageway 64 is a filter element 65 which is effective to remove any contaminants in the fluid pressure flowing from the retainer pipe and passageway 16 via the passageway 55 to the passageway 62.

A retainer by-pass flat disc type check valve 66 is biased in the direction of the valve seat 63 by a spring 67 interposed between the check valve 66 and a cap 68 screw-threaded into the left-hand end of the check valve body 57. The purpose of this retainer by-pass disc type check valve 66 is well known and, as explained in detail in Patent No. 2,444,993 issued July 13, 1948 to William F. Klein, is to release to atmosphere fluid under pressure from the passageway and pipe 16 connecting the brake cylinder release valve device 6 to the retainer 50 while the retainer 50 is in one of its retaining positions, when the brake cylinder release valve device 6 is manually operated in a manner hereinafter described to release fluid under pressure from the brake cylinder device 2. The cap 68 is provided with a port 69 through which fluid under pressure can flow from the retainer 50 via pipe and passageway 16, passageway 55, filter element 65, passageway 62 and past the check valve 66 to the chamber 20 when the check valve 66 is unseated from the valve seat 63 in response to the pressure in the chamber 20 being reduced upon unseating of the rubber-faced valve 40 from valve seat 36 in a manner hereinafter described in detail.

In addition to the chamber 31, the cap 29 is provided with a second chamber 70. Flow of fluid under pressure between the chambers 70 and 31 is controlled by a disc-type check valve 71 disposed in the chamber 70. The disc-type check valve 71 is biased against a seat 72, formed at one end of a bushing 73 that is press-fitted into a counterbore 74 that is coaxial with a bore 75 connecting the chambers 70 and 31, by a spring 76 interposed between the disc-type check valve 71 and a spring seat 76a which may be the form of a snap ring that is inserted in a groove formed in the cap 29.

The disc-type check valve 71 may be manually unseated from the seat 72 by means of a plunger 77. Intermediate its ends the plunger 77 is provided with a collar 78. This collar 78 is disposed in a chamber 79 formed in the cap 29. The upper face of the collar 78 is biased against a cover 80, in the form of an annulus surrounding the plunger 77 on the upper side of the collar 78 and secured to the cap 29 by a plurality of cap screws 81, by a spring 82 interposed between the lower side of the collar 78 and the cap 29. The chamber 79 is connected to the chamber 31 by a bore 83 in the cap 29 through which bore the plunger 77 extends. Surrounding the plunger 77 and disposed in a groove 84 in the wall of the bore 83 is an O-ring seal 85 which is effective to prevent leakage of fluid under pressure along the plunger 77 from the chamber 31 to the chamber 79. The exterior end of the plunger 77 that protrudes through the cover 80 is threaded to receive a correspondingly threaded push button 86.

As is apparent from FIGS. 1 and 2 of the drawings, the port and corresponding passageway 11 opens into the chamber 70 in the cap 29. Since the port and corresponding passageway 11 is connected to the auxiliary reservoir 3, auxiliary reservoir pressure is always present in the chamber 70 and is effective in cooperation with the spring 76 to normally maintain the disc-type check valve 71 seated on the seat 72 to close communication between the chamber 70 and the chamber 31.

*Operation*

Assume initially that the brakes are released and the cylindrical exhaust valve member 22 and the diaphragm 30 of the brake cylinder release valve device 6 are biased by the spring 47 to their normal position in which they are shown in FIG. 2 of the drawings. In this position the valve 21 is out of contact with the valve seat 25 and the rubber-faced valve 40 is in seating contact with the valve seat 36.

When the brake control valve device 5 is now operated in the well-known manner to effect an application and a release of the brakes on the car, fluid under pressure is successively supplied to and released from the brake cylinder device 2 via passageway and port 14, chambers 19 and 20, the passageway and port 15 in the pipe bracket 7 of brake control valve device 5 and the corresponding pipe 15. As the brakes are thus applied and released, the spring 47 will operatively maintain the valve 21 unseated from seat 25 because the fluid under pressure supplied to the chamber 19 from the port and passageway 14 may flow to the chamber 20 and thence through the lateral ports 34 in the bushing 23 to the chamber 33 which is connected by passageway 32 and a choke 87 therein to the chamber 31 so that fluid pressure on the opposite sides of the diaphragm 30 is equalized. Therefore, the pressure in the brake cylinder 2 will vary with variations in the control pressure in the passageway 14. As fluid under pressure is thus supplied to and released from the brake cylinder device 2, the disc-type check valve 71 of the brake cylinder release valve device 6 will be maintained in its normal seated position by the spring 76 since auxiliary reservoir pressure is always present in chamber 70 and the pressure in the chamber 31 can never exceed auxiliary reservoir pressure since the fluid under pressure supplied to the chamber 31 when a brake application is made comes from the auxiliary reservoir.

When a full service brake application is made, the pressure in the auxiliary reservoir 3 and the brake cylinder device 2 equalizes after which the service portion 8 moves to service lap position. Therefore, subsequent to a then full service brake application, the pressure in the chamber 70 and the pressure in the chamber 31 are equal. Therefore, the spring 76 will maintain the check valve 71 seated against the seat 72 when a partial or a full service application of the brakes is made by operation of the brake control valve device 5 in response to a reduction in pressure in the brake pipe 1.

Assume now that while a service brake application is in effect and the passageway 14, chambers 19 and 20, passageway and corresponding pipe 15, and brake cylinder device 2 are charged from the auxiliary reservoir 3 to a pressure corresponding to the reduction of brake pipe pressure, the duplex release valve 13 is momentarily manually operated by a trainman exerting a pull on a handle 88 (FIG. 1) to effect only the unseating of a check valve 89 in the chamber 12 of the duplex release valve 13 to release fluid under pressure from the chamber 12 and hence the auxiliary reservoir 3 via the branch 11a and the passageway and corresponding pipe 11. Since the passageway 11 is connected to the chamber 70, when the duplex release valve 13 is operated to unseat the check valve 12, fluid under pressure will be vented from the auxiliary reservoir 3 and from also the chamber 70 to the atmosphere past the unseated check valve 12. As the pressure in the chamber 70 is thus reduced, the higher pressure retained in the chamber 31 by reason of the choke 87 unseats the check valve 71 from the seat 72 so that fluid under pressure may flow from the chamber 31 to the chamber 70 and thence to atmosphere thereby reducing the pressure in the chambers 31 and 70 at the same rate as the pressure in the auxiliary reservoir 3 is reduced. The choke 87 prevents flow from the passageway 32 to the chamber 31 at the same rate as fluid under pressure is flowing from the chamber 31 past the check valve 71 to the chamber 70 and thence through the passageway 11 and past the now unseated check valve 12 of the duplex release valve 13 to atmosphere. Therefore, as the pressure is reduced in the chamber 31 in the above-described manner, the pressure in the chamber 19, which pressure was supplied thereto via the port and passageway 14 by the service portion 8 of the brake controlling valve device 5, when in its service position (prior to movement to service lap position), establishes a differential on the diaphragm 30 to deflect this diaphragm in the direction of the left hand against the force of the spring 47. Since the diaphragm 30 is operatively connected to the valve 21 and the cylindrical exhaust valve member 22 by the stem 43, the deflection of the diaphragm 30 in the direction of the left hand is effective to move the valve 21 in the direction of the seat 25 until the rubber insert 41 carried by valve 21 contacts the seat 25. Simultaneously, as the valve 21 is moved toward the seat 25, the rubber-faced valve 40 carried by the cylindrical exhaust valve member 22 is moved away from its seat 36 thereby establishing a communication from the chamber 33 to the exhaust port 18. Fluid under pressure will now be released from the brake cylinder device 2 via pipe 15 and the corresponding passageway in the pipe bracket 7, the outlet chamber 20, the passageway 48 in the cylindrical exhaust valve member 22, the now partly open lateral ports 34 in the bushing 23, annular passageway 35, chamber 33, past the now open rubber-faced valve 40, and thence through the bushing 37 to the exhaust port 18 where the fluid under pressure acts on the wasp excluder 49 to deflect it in the direction of the right hand so that fluid under pressure may flow from the exhaust port 18 to atmosphere. Fluid under pressure will now flow from the brake cylinder device 2 to the atmosphere until the pressure in the brake cylinder device is reduced to atmospheric pressure.

At the same time as fluid under pressure is thus vented from the brake cylinder device 2, fluid under pressure is also vented at a restricted rate from the chamber 31 via the choke 87, passageway 32, chamber 33, past the now unseated rubber-faced valve 40 and through the bushing 37 to the exhaust port 18 and thence past the wasp excluder 49 to atmosphere until the pressure in chamber 31 is reduced to atmospheric pressure. As fluid under pressure is thus vented from the chamber 31, it will be noted that the spring 76 maintains the check valve 71 in contact with seat 72 to prevent a reduction in auxiliary reservoir pressure present in chamber 70.

With the chambers 31 and 20 now at atmospheric pressure, the pressure present in the chamber 19 is effective on the right-hand side of the diaphragm 30 to maintain the rubber insert 41 of the valve 21 in contact with the seat 25 thereby bottling up the pressure in the chamber 19 and the port and corresponding passageway 14 until the service portion 8 of the brake controlling valve device 5 moves from its service lap position to its release position in response to an increase in the pressure in the brake pipe 1 to release the pressure in the chamber 19 via the service portion 8 in the usual manner.

If desired, while the service portion 8 of the brake control valve device 5 remains in its service lap position, a trainman can effect restoration of the brake cylinder release valve device 6 to its original or normal position in which the valve 21 is unseated from the seat 25 and the rubber-faced valve 40 is seated on the seat 36.

To effect restoration of the brake cylinder release valve device 6 to its normal position, the trainman will exert a push on the push button 86 to thereby move the plunger 77 in a downward direction, as viewed in FIG. 2, against the yielding resistance of the spring 82 until the lower end of the plunger 77 unseats the check valve 71 against the yielding resistance of the spring 76 from the valve seat 72. When the check valve 71 is thus unseated from the valve seat 72, fluid at auxiliary reservoir pressure will flow from the chamber 70 past the unseated check valve 71 and through the bushing 73 to the chamber 31 whereupon the pressure in the chamber 31 is built up until it is equal to the pressure in the auxiliary reservoir 3 and the chamber 70. Since the pressure now trapped in the chamber 19 was originally supplied thereto from the auxiliary reservoir 3 when the service application of the brakes was effected by a reduction in the pressure in the brake pipe 1, this trapped pressure in chamber 19 is substantially equal to the pressure supplied from the auxiliary reservoir 3 to the chamber 31 upon the unseating of the check valve 71 by the plunger 77. Therefore, when the pressures on the opposite sides of the diaphragm 30 become substantially equal, the spring 47 is rendered effective to deflect the diaphragm 30 in the direction of the right hand and thereby, through the stem 43, move the rubber insert 41 of the valve 21 away from the valve seat 25 and the rubber-faced valve 40 toward the valve seat 36 until the rubber-faced valve 40 is brought into seating contact with the valve seat 36 to close communication between the brake cylinder device 2 and atmosphere.

When the valve 21 is unseated, as explained above, a communication is established between the chamber 19 and the chamber 20 which is connected via the port, passageway and pipe 15 to the brake cylinder device 2. However, a reapplication of the brakes will not occur since the service portion 8 of the brake control valve device 5 is now, as above stated, in its service lap position in which the auxiliary reservoir 3 is cut off from the passageway 14 by the graduating valve of the service portion 8 (see page 55 of Instruction Pamphlet No. 5062 published by Westinghouse Air Brake Company, December, 1945).

If now the pressure in the brake pipe 1 is increased to its normal charged value, the graduating valves and slide valves of the service portion 8 and emergency portion 9 of the brake control valve device 5 will respectively be returned to their normal release position in which the auxiliary reservoir 3 and emergency reservoir 4 are fully charged to the pressure normally carried in the brake pipe 1.

With the brakes released, whenever the pressure in the brake pipe 1 is reduced at an emergency rate, the brake control valve device 5 will operate in the well-known manner of the AB control valve device to effect an emergency application of the brakes in which both the auxiliary reservoir 3 and the emergency reservoir 4 are connected to the brake cylinder device 2 so that the pressures in these two reservoirs and the brake cylinder device become equalized.

Furthermore, when a freight car is set off on a siding or is cut out of a train for humping operations in a railway classification yard, the pressure in the brake pipe 1 on the car thus disconnected from a train is reduced to atmospheric pressure. This reduction in the pressure in the brake pipe to atmospheric pressure is effective to cause the service portion 8 and the emergency portion 9 of the brake control valve device 5 on the car to move to their respective service and emergency positions in which both the auxiliary reservoir 3 and the emergency rerservoir 4 are connected to the brake cylinder device 2.

Let it now be supposed that, while an emergency application of the brakes is in effect, a trainman desires to release the emergency brake application by venting the fluid under pressure from the brake cylinder device 2 without depleting the fluid under pressure remaining in the auxiliary reservoir 3 and the emergency reservoir 4. To do so, the trainman will momentarily manually operate the duplex release valve 13 by exerting a pull on the handle 88 to effect only the unseating of the check valve 89 in the chamber 12 of the duplex release valve. When the check valve 89 is thus unseated, fluid under pressure will be momentarily vented from the auxiliary reservoir 3 and the chambers 70 and 31 of the brake cylinder release valve device 6 to atmosphere whereupon the brake cylinder release valve device 6 will operate in the manner hereinbefore explained in detail to completely vent the fluid under pressure in the brake cylinder device 2 to atmosphere and thereby effect a release of the brakes on the car, without venting the fluid under pressure in the auxiliary reservoir 3 and the emergency reservoir 4.

Let is now be supposed that subsequent to releasing the emergency brake application on the car, the trainman desires to supply fluid under pressure to the brake cylinder device 2 to effect a reapplication of the brakes on the car. To effect a reapplication of the brakes, the trainman will push on the push button 86 to move the plunger 77 in a downward direction, as viewed in FIG. 2, against the bias of the spring 82 until the lower end of the plunger 77 contacts the upper side of the disc-type check valve 71. As the trainman continues to push on the push button 86, the plunger 77 will move further in a downward direction to unseat the disc-type check valve 71 from its seat 72 against the bias of the spring 76. When the check valve 71 is thus unseated from its seat 72, auxiliary reservoir pressure, which is present in the chamber 70, will flow from the chamber 70 past the now unseated check valve 71 and through the bushing 73 to the chamber 31 to increase the pressure therein.

The pressure thus applied to the chamber 31 cannot flow through the choke 87 to the passageway 82 as fast as it is being supplied to the chamber 31 past the now unseated check valve 71. Consequently, the pressure in the chamber 31 will increase until it is equal to the pressure in the auxiliary reservoir 3. Therefore, when the pressures in the chamber 31 and in the chamber 19 are substantially equal, the spring 47 will deflect the diaphragm 30 in the direction of the right hand and thereby move the rubber insert 41 of the valve 21 away from the seat 25 thus establishing a communication from the chamber 19 to the chamber 20.

Since the service portion 8 of the brake control valve device 5 is now in its service position and the emergency portion 9 is in its emergency position as a result of the emergency brake application effected by reducing the pressure in the brake pipe 1 to atmospheric pressure at the time the car was disconnected from the train, the auxiliary reservoir 3 is connected through the service portion slide valve and the passageway 14 to the chamber 19. Also, the emergency reservoir 4 is connected through the emergency portion 9 to the passageway 14. Accordingly, when the valve 21 is unseated to establish a communication from the chamber 19 to the chamber 20, fluid under pressure will now flow from both the auxiliary reservoir 3 and the emergency reservoir 4 to the passageway 14 and thence through chambers 19 and 21 to the port and passageway 15 and the corresponding pipe to the brake cylinder device 2 until the remaining pressure in the auxiliary reservoir and the emergency reservoir equalize into the brake cylinder device 2. This resupply of fluid under pressure from the auxiliary reservoir 3 and the emergency reservoir 4 to the brake cylinder device 2 effects a reapplication of the brakes on the car.

After the brakes have been reapplied in the manner just described, they can again be released by the trainman exerting a pull on the handle 88 of the duplex release valve 13 to unseat the check valve 89 in the chamber 12. When the check valve 89 in the chamber 12 is thus unseated, fluid under pressure will be vented from the auxiliary reservoir 3 and from the chambers 70 and 31 of the brake cylinder release valve device 6 in the manner hereinbefore described in detail. When the pressure is thus reduced in the chamber 31 of the brake cylinder release valve device 6, the higher pressure remaining in the chamber 19 deflects the diaphragm 30 in the direction of the left hand to again move the rubber-faced valve 40 away from the seat 36 and the rubber insert 41 carried by the valve 21 into seating contact with the valve seat 25. When the valve 21 is thus reseated on seat 25 and the passageway 14 and chamber 19 are cut off from chamber 20, the chamber 20 and the brake cylinder device 2, connected thereto via the pipe and passageway 15, are vented to atmosphere through the passageway 48 in the cylindrical exhaust valve member 22, the now partly open lateral ports 34, the chamber 33, thence past the valve seat 36 and through the bushing 37 to the exhaust port 18 to deflect the wasp excluder 19 in the direction of the right hand and thereby permit fluid under pressure from the brake cylinder device 2 to be released to atmosphere until the pressure in the brake cylinder device 2 is reduced to atmospheric pressure.

If the trainman again desires to reapply the brakes, he may do so by pressing the push button 86 to unseat the check valve 71 of the brake cylinder release valve device 6. Fluid under pressure will again flow from the auxiliary reservoir 3 to the chamber 31 to deflect the diaphragm 30 to open the valve 21 and to reapply the brakes on the car in the manner hereinbefore described.

From the above, it is apparent that the trainman may apply and release the brakes on a car detached from a train until substantially all of the fluid pressure in the auxiliary reservoir 3 and the emergency reservoir 4 has been depleted.

When a car that has been detached from a train and the brake cylinder release valve device 6 operated to release and reapply the brakes until the pressure in the auxiliary reservoir 3 and emergency reservoir 4 has been partially or completely depleted, is again coupled up into a train, the brake pipe 1 will be recharged in the usual manner. When the brake pipe 1 is recharged, the service portion 8 of the brake control valve device 5 will be operated in response to this increase in brake pipe pressure from its service position to its release position. Likewise, as the brake pipe 1 is recharged, the emergency portion 9 of the brake control device 5 will operate in response to the increase in brake pipe pressure to move from its emergency position to its release position. When the service portion 8 of the brake control valve device 5 is restored to its release position, the passageway 14 will be connected via a service slide valve cavity 90 to the passageway and corresponding pipe 16. Since the pipe 16 is connected to the retainer 50, fluid under pressure will now flow from the chamber 19 via the passageway 14, the cavity 90, the passageway and pipe 16 to the retainer 50. If the retainer 50 is in its open or position 1, fluid under pressure will be completely vented from the chamber 19 to atmosphere. If at the time the chamber 19 is thus connected to atmosphere the valve 21 is seated on seat 25, this reduction in pressure in the chamber 19 will render the spring 47 effective to deflect the diaphragm 30 in the direction of the right hand and through the stem 43 move the valve 21 away from the seat 25 until the rubber-faced valve 40 contacts the valve seat 36. Therefore, if the brake cylinder release valve device 6 has been operated to release pressure from the brake cylinder device 2, prior to the time the car is again coupled into a train, it will be seen from the above that the brake cylinder release valve device 6 is automatically restored to its normal position in which the valve 21 is unseated from the valve seat 25 so that upon a subsequent application of the brakes fluid under pressure may be supplied to the brake cylinder device 2 to effect an application of the brakes. If, on the other hand, at the time the car is again coupled into a train, the parts of the brake cylinder release valve device 6 occupy the position in which they are shown in FIG. 2, and pressure is still present in the brake cylinder device 2, this pressure will be released via the pipe and passageway 15, chamber 20, chamber 19, passageway 14, cavity 90 in the service slide valve, passageway and pipe 16, and the retainer 50.

In view of the foregoing description of the operation of the brake cylinder release valve device 6, it is apparent that after a service brake application, this brake cylinder release valve device can be manually operated by exerting a pull on the handle 88 of the duplex release valve device 13 to completely release fluid under pressure from the brake cylinder device 2 to atmosphere. However, the brakes cannot be reapplied since the service portion 8 of the brake control valve device 5 is in lap position. It will be noted, however, that the brake cylinder release valve device 6 can be restored to its normal position by pressing the push button 86. Therefore, the brake cylinder release valve device 6 can be restored to its original normal position so that upon a subsequent application of the brakes fluid under pressure can be supplied to the brake cylinder device 2.

Furthermore, subsequent to an emergency application of the brakes, the brake cylinder release valve device 6 can be operated repeatedly by a trainman to release fluid under pressure from the brake cylinder device 2 to atmosphere and then resupply fluid under pressure to the brake cylinder device 2 to effect a reapplication of the brakes until substantially all of the fluid pressure present in the auxiliary reservoir 3 and the emergency reservoir 4 has been depleted.

Having now described the invention, what I claim as new and desire to secure by Letters Patent, is:

1. In a fluid pressure brake system for railway vehicles, the combination of:
   (a) a brake pipe,
   (b) an auxiliary reservoir,
   (c) a brake cylinder device,
   (d) a brake control valve device responsive to a reduction in brake pipe pressure to effect the supply of fluid under pressure from the auxiliary reservoir to the brake cylinder device to effect a brake application and responsive to an increase in brake pipe pressure to effect the venting of fluid under pressure from said brake cylinder device to atmosphere to effect the release of a brake application, said brake control valve device having a manually operated release valve device for effecting a reduction in the pressure in the auxiliary reservoir, and
   (e) a brake cylinder release valve device interposed between the brake control valve device and the brake cylinder device, said brake cylinder release valve device comprising:
      (i) valve means for controlling a first communication between the brake control valve device and the brake cylinder device and a second communication between the brake cylinder device and atmosphere,
      (ii) a movable abutment operably connected to said valve means and subject in chambers on its opposite sides respectively, upon at least a full service application of the brakes being effected, to the pressure supplied from the auxiliary reservoir by said brake control valve device to said brake cylinder device,
      (iii) restrictor means connecting the chambers on the opposite sides of said movable abutment,
      (iv) means including check valve means providing communication between the one of said chambers and the said auxiliary reservoir for effecting a reduction of fluid under pressure in said one chamber in correspondence with reduction of pressure in said auxiliary reservoir effected by said manually operated release valve device, said movable abutment being rendered effective by said restrictor means in response to a reduction in the pressure in the auxiliary reservoir and correspondingly in said one chamber effected by operation of the manually operated release valve device of the brake control valve device to move said valve means to a position to close the first communication between the brake control valve device and the brake cylinder device and to open the second communication between the brake cylinder device and atmosphere,
      (v) manually operative means to effect the supply of fluid under pressure from the auxiliary reservoir to the said one chamber and thence via said restrictor means to the other of said chambers to effect equalization of pressures on the opposite sides of said movable abutment, and
      (vi) biasing means exerting on said movable abutment a bias in the direction to cause said movable abutment to move said valve means to a position to establish said first communication upon equalization of pressures on the respective opposite sides of said movable abutment.

2. A fluid pressure brake system for railway vehicles as claimed in claim 1, further characterized in that said manually operative means comprises a manually operative plunger for effecting unseating of said check valve means to connect the auxiliarly reservoir to the said one chamber.

3. In a fluid pressure brake control system for controlling braking of a railway car, the combination of:
   (a) a brake pipe,
   (b) an auxiliary reservoir,
   (c) a brake cylinder device,
   (d) a brake control valve device responsive to a reduction in brake pipe pressure to effect the supply of fluid under pressure from the auxiliary reservoir to the brake cylinder device to effect a brake application and responsive to an increase in brake pipe pressure to effect the venting of fluid under pressure from said brake cylinder device to atmosphere to effect the release of a brake application, said brake control valve device having a manually operated release valve device for releasing fluid under pressure from the auxiliary reservoir, and
   (e) a brake cylinder release valve device interposed between the brake control valve device and the brake cylinder device for controlling the flow of fluid under pressure to and from said brake cylinder device, said brake cylinder release valve device comprising:
      (i) a first valve means having a normal position in which it connects the brake control valve device with the brake cylinder device and a release position in which it disconnects the brake control valve device from the brake cylinder device and connects the latter to atmosphere,
      (ii) a double-acting fluid pressure operated movable abutment operatively connected to said first valve means,
      (iii) bias means exerting on one end of said double-acting fluid pressure operated movable abutment a relatively light bias to normally maintain said first valve means in its normal position,
      (iv) a restricted choke means effective when said first valve means occupies its normal position to establish a communication between the opposite sides of said double-acting fluid pressure operated movable abutment to cause equalization of opposing fluid pressures acting on said double-acting fluid pressure operated movable abutment to render it inoperative,
      (v) a second valve means controlling communication between said one side of said double-acting fluid pressure operated movable abutment and the auxiliary reservoir, said second valve means being operable in response to a slight reduction in the pressure in the auxiliary reservoir effected by manual operation of the release valve device of the brake control valve device to effect substantially the same degree of reduction in the pressure acting on said one side of said double-acting fluid pressure operated movable abutment thereby rendering said restricted choke means effective to cause a differential fluid pressure corresponding substantially to the value of the pressure supplied by said brake control valve device to said brake cylinder device to be established on the other side of said double-acting fluid pressure operated movable abutment to deflect said double-acting fluid pressure operated movable abutment in the direction to move said first valve means from its normal position to its release position and hold said first valve means in its release position against opposition of said bias means provided and so long as the pressure supplied by said brake control valve device is above a predetermined low value and in excess of the reduced pressure acting on said one side of said double-acting fluid pressure operated movable abutment, and
      (vi) manually operated brake reapplication means for operating said second valve means to effect the supply of fluid under pressure from the auxiliary reservoir to said one side of said double-acting fluid pressure operated movable abutment to cause substantial equalization of opposing fluid pressures acting on said double-acting fluid pressure operated movable abutment to thereby render said bias means effective to restore said first valve means to its normal position in which said brake control valve device is reconnected to said brake cylinder device to effect a reapplication of the brakes on the railway car.

4. A fluid pressure control system for controlling braking of a railway car, as claimed in claim 3, further characterized in that said second valve means is constructed in the form of a spring-biased disc-type check valve that opens in the direction of the auxiliary reservoir for establishing a communication through which fluid under pressure may flow from said one side of said double-acting fluid pressure operated movable abutment.

5. A fluid pressure control system for controlling braking of a railway car, as claimed in claim 3, further characterized in that said manually operated brake reapplication means is constructed in the form of a spring-biased push button operated plunger slidably mounted in said brake cylinder release valve device for movement in the direction of said second valve means to effect operation thereof to establish a communication through which fluid under pressure may flow from the auxiliary reservoir to said one side of said double-acting fluid pressure operated movable abutment.

6. A fluid pressure control system for controlling braking of a railway car, as claimed in claim 3, further characterized in that said second valve means comprises a check valve that opens only in a direction away from said one side of said double-acting fluid pressure operated movable abutment, and in that said manually operated brake reapplication means comprises a manually operated plunger movable in a direction to effect opening of said check valve.

7. In a fluid pressure brake system for a railway car, the combination of:
   (a) a brake pipe,
   (b) a fluid pressure storage reservoir,
   (c) a brake cylinder device,
   (d) a brake control valve device having a manually operated release valve for releasing fluid under pressure from said fluid pressure storage reservoir to atmosphere, said brake control valve device being operable in response to a reduction in the pressure in said brake pipe to effect the supply of fluid under pressure from said fluid pressure storage reservoir to said brake cylinder device, and in response to an increase in the pressure in said brake pipe to effect a release of fluid under pressure from said brake cylinder device to atmosphere and recharging of said fluid pressure storage reservoir from said brake pipe, and
   (e) a brake cylinder release valve device interposed between the brake cylinder device and the brake control valve device and comprising, in combination:
      (i) a casing providing a plurality of chambers one of which is supplied with fluid under pressure from said fluid pressure storage reservoir,
      (ii) a spring-biased check valve controlling flow between the one chamber and a second chamber and operable in response to a reduction in the pressure of said fluid pressure storage reservoir acting in the one chamber effected by manual operation of the release valve of the brake control valve device to reduce the pressure in the second chamber simultaneously with the reduction of pressure in the one chamber and said fluid pressure storage reservoir,
      (iii) a third chamber communicating with the brake control valve device and supplied with fluid under pressure therefrom upon a reduction in the pressure in the brake pipe,
      (iv) a fourth chamber communicating with the brake cylinder device,
      (v) a valve controlling connection of the third chamber with the fourth chamber,
      (vi) a movable abutment subject opposingly to pressures of fluid in the second and third chambers, and operatively connected to said valve to effect movement thereof from a normal position in which the valve connects the third chamber with the fourth chamber to a release position in which it closes communication between the third and fourth chambers and vents said fourth chamber and the brake cylinder device to atmosphere,
      (vii) choke means connecting the fourth and second chambers to provide equalization of pressures on opposite sides of said movable abutment so long as said spring-biased check valve closes communication between the first and second chambers and said valve occupies its normal position opening communication between the third and fourth chamber, said choke means being effective to establish a differential fluid pressure on the side of said movable abutment adjacent the third chamber upon a reduction in the pressure on the opposite side of said abutment in response to momentary manual operation of the release valve of the brake control valve device to slightly reduce the pressure in the fluid pressure storage reservoir whereby said movable abutment moves said valve from its normal position to its release position to effect release of fluid under pressure from the brake cylinder device to atmosphere,
      (viii) manually operated reset means operable to unseat said spring-biased check valve to effect equalization of pressures on said movable abutment notwithstanding said valve being in its release position, and
      (ix) biasing means rendered effective in response to equalization of pressures on said movable abutment effected by operation of said manually operated reset means to restore said valve from its release position to its normal position in which the brake control valve device is reconnected to the brake cylinder device to resupply fluid under pressure thereto from the fluid pressure storage reservoir to effect a reapplication of the brakes on the car.

8. For interposition between a brake control valve device and a brake cylinder device of a fluid pressure brake system, a brake cylinder release valve device, comprising, in combination:
   (a) a double-acting fluid pressure motor having a chamber at each side thereof,
   (b) means providing a communication via which fluid under pressure may flow between the chambers at the opposite sides of said double-acting fluid pressure motor,
   (c) restrictor means disposed in said communication connecting the chambers at the opposite sides of said double-acting fluid pressure motor, said restrictor means being effective upon venting fluid under pressure from the chamber at one side of said double-acting fluid pressure motor to cause a differential fluid pressure force to be established thereon in the chamber at the opposite side thereof,
   (d) valve means operatively connected to said double-acting fluid pressure motor and having a normal position in which it connects the brake control valve device with the brake cylinder device and a release position in which it disconnects the brake control valve device from the brake cylinder device and connects the latter to atmosphere, (e) bias means disposed on said one end of said double-acting fluid pressure motor and exerting on said valve means a relatively light bias toward its normal position, (f) said double-acting fluid pressure motor being operative in response to the establishment of a differential fluid pressure force on the said opposite side thereof to move said valve means from its normal position to its release position, (g) said valve means in its release position disconnecting the said communication from the chamber at said opposite side of said double-acting fluid pressure motor and connecting said communication to atmosphere, thereby to cause said double-acting fluid pressure motor to hold said valve means in its release position against opposition of said bias means so long as the pressure in the chamber at the opposite side of said double-acting fluid pressure motor is above a predetermined low value, and (h) manually operative means to effect the supply of fluid under pressure to the chamber at the said one side of said double-acting fluid pressure motor independently of said communication to effect equalization of pressure in the chambers on the opposite sides of said double-acting fluid pressure motor thereby to render said bias means effective to restore said valve means to its normal position.

References Cited in the file of this patent

UNITED STATES PATENTS 2,366,044     McCune     Dec. 26, 1944
3,059,973     Parshall     Oct. 23, 1962